US006847952B2

(12) United States Patent
Beckstrom et al.

(10) Patent No.: US 6,847,952 B2
(45) **Date of Patent: *Jan. 25, 2005**

(54) POSTAGE METERING SYSTEM HAVING MULTIPLE POSTAGE METER CONFIGURATION CAPABILITY

(75) Inventors: David W. Beckstrom, Fairfield, CT (US); Donald T. Dolan, Ridgefield, CT (US); Joan T. Doutney, Sandy Hook, CT (US); Yakup J. Igval, Milford, CT (US); Sungwon R. Moh, Wilton, CT (US); Christina S. Park, Lausanne (CH); Roger J. Ratzenberger, Jr., Milford, CT (US); Richard P. Schoonmaker, Wilton, CT (US); James R. West, Stamford, CT (US)

(73) Assignee: Pitney Bowes Inc., Stamford, CT (US)

( * ) Notice: Subject to any disclaimer, the term of this patent is extended or adjusted under 35 U.S.C. 154(b) by 206 days.

This patent is subject to a terminal disclaimer.

(21) Appl. No.: 10/065,627

(22) Filed: Nov. 4, 2002

(65) Prior Publication Data

US 2003/0037007 A1 Feb. 20, 2003

Related U.S. Application Data

(63) Continuation of application No. 09/294,606, filed on Apr. 19, 1999, now Pat. No. 6,477,512.

(51) Int. Cl.[7] .......... G06F 17/60

(52) U.S. Cl. .......... 705/60; 705/410; 705/407; 705/408; 380/51

(58) Field of Search .......... 705/410, 60, 407, 705/408; 380/51

(56) References Cited

U.S. PATENT DOCUMENTS

| | | | | | |
|---|---|---|---|---|---|
| 5,509,109 | A | * | 4/1996 | Kim et al. | 358/1.15 |
| 5,731,980 | A | * | 3/1998 | Dolan et al. | 705/410 |
| 5,746,881 | A | * | 5/1998 | Jenkins et al. | 156/578 |
| 5,787,406 | A | * | 7/1998 | Arsenault et al. | 705/410 |

FOREIGN PATENT DOCUMENTS

| | | | | | |
|---|---|---|---|---|---|
| DE | 0 825 561 | A2 | * | 2/1998 | G07B/17/00 |
| GB | 2 326 130 | A | * | 12/1998 | G07B/17/02 |

OTHER PUBLICATIONS

"PMG Runyon Reports to BOG". Direct Marketing v60n1 p 15. May 1997 [DIALOG].*

"Home Office US Postal SVC". Business Wire; Mar. 31, 1997. [DIALOG].*

* cited by examiner

*Primary Examiner*—James P. Trammell
*Assistant Examiner*—James A. Reagan
(74) *Attorney, Agent, or Firm*—Angelo N. Chaclas; Charles R. Malandra; George M. Macdonald

(57) ABSTRACT

A postage metering system includes a base and a user interface mounted to the base. The user interface includes a micro controller, an internal socket for receiving an integrated circuit chip and a smart card reader interface connector for interfacing with an external smart card. The micro controller is configurable to address either the internal socket or the smart card reader interface connector to access postage metering functionality.

8 Claims, 4 Drawing Sheets

POSTAGE METERING SYSTEM HAVING MULTIPLE POSTAGE METER CONFIGURATION CAPABILITY

CROSS REFERENCE TO RELATED APPLICATIONS

This application is a continuation of commonly assigned U.S. patent application Ser. No. 09/294,606, filed Apr. 19, 1999, which is hereby incorporated by reference in its entirety. This application is related to the following concurrently filed U.S. patent applications: Ser. code/No. 09/294,607 entitled POSTAGE METERING SYSTEM HAVING CURRENCY SYNCHRONIZATION now U.S. Pat. No. 6,188,997; Ser. code/No. 09/294,605 entitled POSTAGE METERING SYSTEM HAVING SEPARABLE MODULES WITH MULTIPLE CURRENCY CAPABILITY AND SYNCHRONIZATION now U.S. Pat. No. 6,178,412 and Ser. code/No. 09/294,604 entitled POSTAGE METERING SYSTEM HAVING CURRENCY COMPATIBILITY SECURITY FEATURE now U.S. Pat. No. 6,154,734, the disclosures of which are specifically incorporated herein by reference.

BACKGROUND OF INVENTION

1. Field of the Invention

This invention relates to value dispensing systems. More particularly, this invention is directed to a flexible postage metering system that provides for the interchangeability of modules and multiple postage meter configuration capability.

2. Background of the Invention

One example of a value dispensing system is a postage metering system including an electronic postage meter and a printer for printing a postal indicia on an envelope or other mailpiece. Recent efforts have concentrated on removing the printer from being an integral part of the postage meter and generally off loading functionality from the postage meter to the remainder of the postage metering system. Also, the postage meter is generally detachable from the postage metering system so that different postage meters may be operatively coupled with the remainder of the postage metering system.

Electronic postage meters for dispensing postage and accounting for the amount of postage used are well known in the art. The postage metering system supplies proof of the postage dispensed by printing a postal indicia which indicates the value of the postage on an envelope or the like. The typical postage meter stores accounting information concerning its usage in a variety of registers. In a pre-payment type of postage meter, such as those employed in the United States, an ascending register tracks the total amount of postage dispensed by the meter over its lifetime. That is, the ascending register is incremented by the amount of postage dispensed after each transaction. A descending register tracks the amount of postage available for use. Thus, the descending register is decremented by the amount of postage dispensed after each transaction. When the descending register has been decremented to some value insufficient for dispensing postage, then the postage meter inhibits further printing of indicia until the descending register is resupplied with funds. In a post-payment type of postage meter, such as those employed in France, the ascending register may be retained as described above while the descending register is eliminated or set to an extremely high value.

Because postage meters store and dispense postage, it is important that they operate reliably. Otherwise, a user may experience a loss of postal funds (money) if the postage meter were to experience a malfunction. Therefore, postage meter manufacturers typically exercise great care to ensure the reliable operation of the postage meter.

To remain competitive in a global marketplace, it is important to design and manufacture postage metering systems that comply with the various requirements of each of the postal authorities located around the world. Without approval from the postal authority, the postage metering system manufacturer cannot bring products to market. Because postage metering systems print an indicia of value (postage, money, etc.), they are subject to a great deal of regulation by the postal authorities which may vary widely from country to country. For example, in some countries, such as the United States, it is unlawful to sell a postage meter. They may only be rented and are subject to periodic inspection. On the other hand, postage meters may be sold in other countries. As another example, debit card based postage meters are permitted in some countries while in others they are not.

As another consideration, interchangeability of components, such as using the same postage meter with a plurality of different printers or using a plurality of different postage meters with the same printer is desirable. For example, a mailer located near the boarder of two countries may have need to post mail in both countries. So as to avoid redundancy and expense, the mailer would not want to operate two metering systems. As another example, a business office may contemplate placing the postage metering system without the postage meter in a generally accessible area and issuing postage meters to various individuals and/or departments. In this manner, anyone with a postage meter could utilize the postage metering system.

Therefore, there is a need for a cost effective postage metering system having an architecture that allows for the interchangeability of modules, protects against the loss of postal funds and facilitates efficient manufacture, distribution, service and compliance with local postage meter configuration requirements.

SUMMARY OF INVENTION

Accordingly, it is an object of the present invention to provide a postage metering system with improved flexibility for adapting the configuration of the postage meter to meet the requirements of the various postal authorities.

In accomplishing these and other objects there is provided a postage metering system including a base and a user interface mounted to the base. The user interface includes a micro controller, an internal socket for receiving an integrated circuit chip and a smart card reader interface connector for interfacing with an external smart card. The micro controller is configurable to address either the internal socket or the smart card reader interface connector to access postage metering functionality.

Furthermore, in accomplishing these and other objects there is provided a method of operating a postage metering system and a method of manufacturing a postage metering system that are generally analogous to the summary provided above.

Therefore, it should now be apparent that the invention substantially achieves the objects and advantages discussed above. Additional objects and advantages of the invention will be set forth in the description that follows, and in part will be obvious from the description, or may be learned by practice of the invention. Moreover, the objects and advantages of the invention may be realized and obtained by means of the instrumentalities and combinations particularly pointed out in the appended claims.

BRIEF DESCRIPTION OF DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown through out the drawings, like reference numerals designate like or corresponding parts.

DETAILED DESCRIPTION

Figure 1:
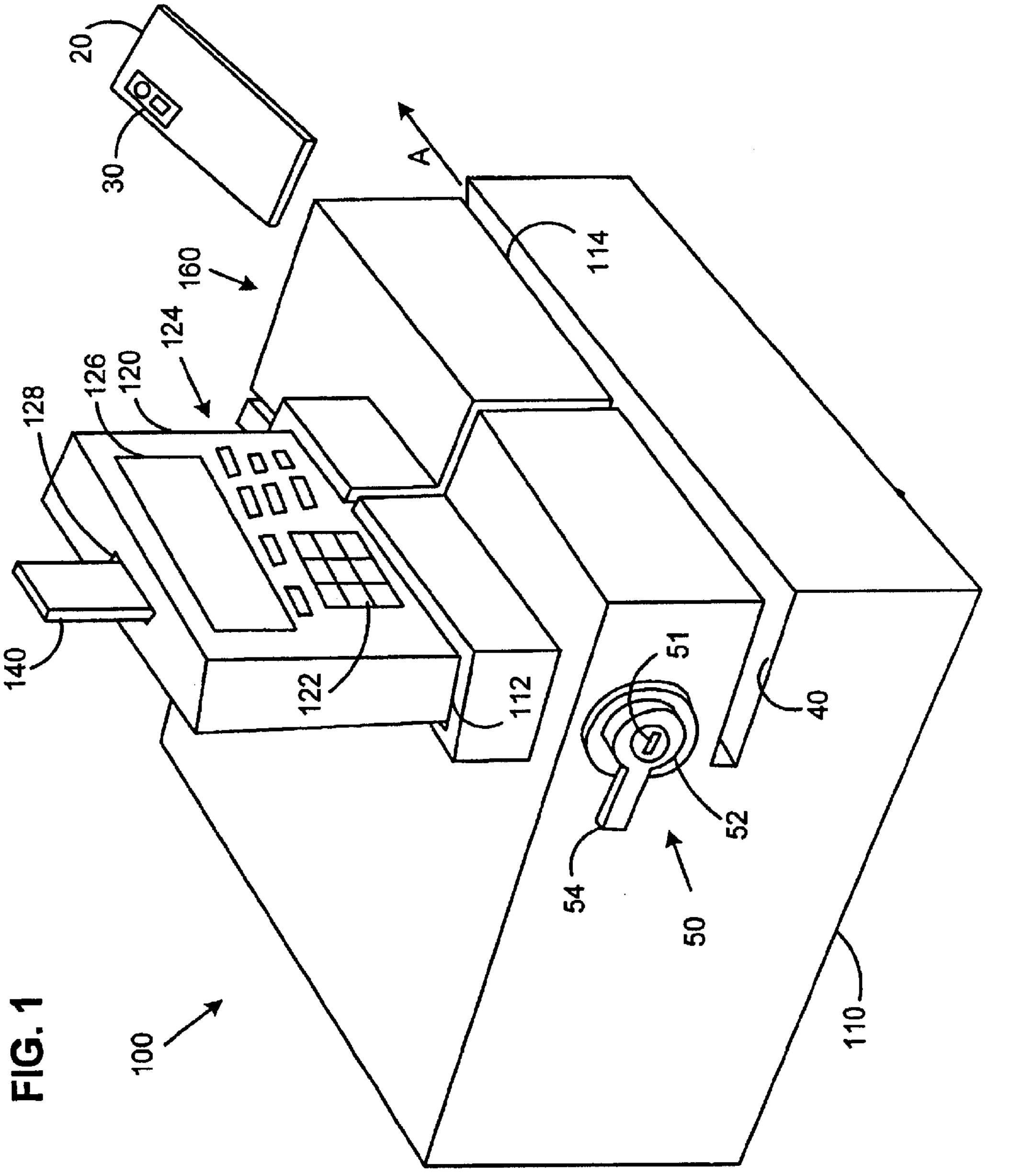
FIG. 1 is a perspective view of a postage metering system including a base, a user interface, a postage meter and a printer assembly in a first most preferred configuration in accordance with the present invention.

Referring to FIG. 1, a postage metering system 100 in accordance with the present invention and a first most preferred configuration is shown. The postage metering system 100 includes a mailing machine base 110, a user interface 120, a postage meter 140 and a printer assembly 160 for printing a postal indicia 30 on a mailpiece 20 (envelope, post card, tape strip or the like). Generally, the base 110, the user interface 120, the postage meter 140 and the printer assembly 160 are all in communication with each other over suitable communication lines (not shown).

Figure 5:
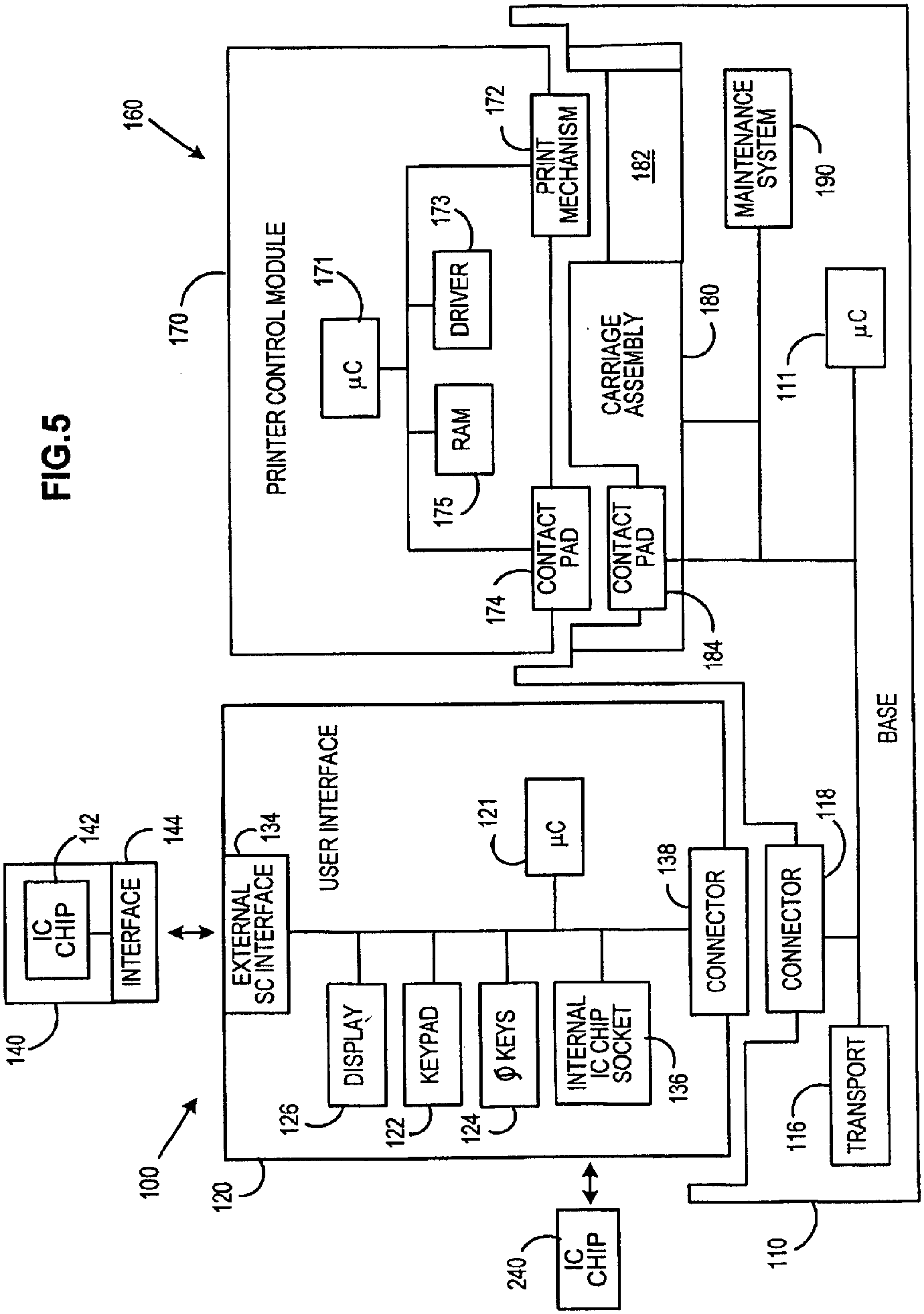
FIG. 5 is a simplified schematic representation of the postage metering system in accordance with the present invention.

Referring to FIGS. 1 and 5, the mailing machine base 110 may include a variety of different modules (not shown) where each module performs a different task on the mailpiece 20 such as: singulating (separating the mailpieces one at a time from a sack of mailpieces), weighing, moistening/sealing (wetting and closing the glued flap of an envelope) and transporting the mailpiece 20 in a path of travel as indicated by the arrow A through the various modules. However, the exact configuration of each mailing machine base 110 is particular to the needs of the user. The mailing machine base 110 includes a pocket 112 for receiving the user interface 120, a latch assembly 50 for securing the user interface 120 in place and other structure (not shown) for interfacing with the user interface 120. Additionally, the base 110 includes a micro controller 111 for overseeing the operation of the base 110 and a deck 40 along which the mailpiece 20 is fed by a transport assembly 116. Since a detailed description of the mailing machine base 110 is not necessary for an understanding of the present invention, its description will be limited for the sake of clarity.

Generally, the user interface 120 is for displaying messages to and receiving commands from an operator of the postage metering system 100 and is detachably mounted to the base 110 by insertion into the pocket 112. The user interface 120 includes a micro controller 121, a numeric keypad 122, a plurality of function keys 124, a display (CRT, LCD, LED or the like) 126 and a slot 128 for receiving the postage meter 140. A more detailed description of the user interface 120 and its operation will be provided below.

The postage meter 140 is a smart card type device. A smart card is a small electronic device about the size of a credit card that contains an embedded integrated circuit. Examples of suitable smart cards are an ISO 7816 series type smart card device and a PCMCIA (Personal Computer Memory Card International Association) smart card device. However, other appropriate formats may be employed. The postage meter 140 is detachably mounted to the user interface 120 by inserting it in a conventional manner into the slot 128. Generally, the postage meter 140 includes a micro controller having memory in the form of an integrated circuit (IC) chip 142 for storing accounting information (not shown), such as register data, and generating tokens (not shown) for each mailpiece 20 so that the postal indicia 30 may be verified by the postal authority. The postage meter 140 further includes an interface connector 144 for allowing the postage meter 140 to communicate with the user interface 120. Since further details of the token are not necessary for an understanding of the present invention, no further description will be provided.

Figure 2:
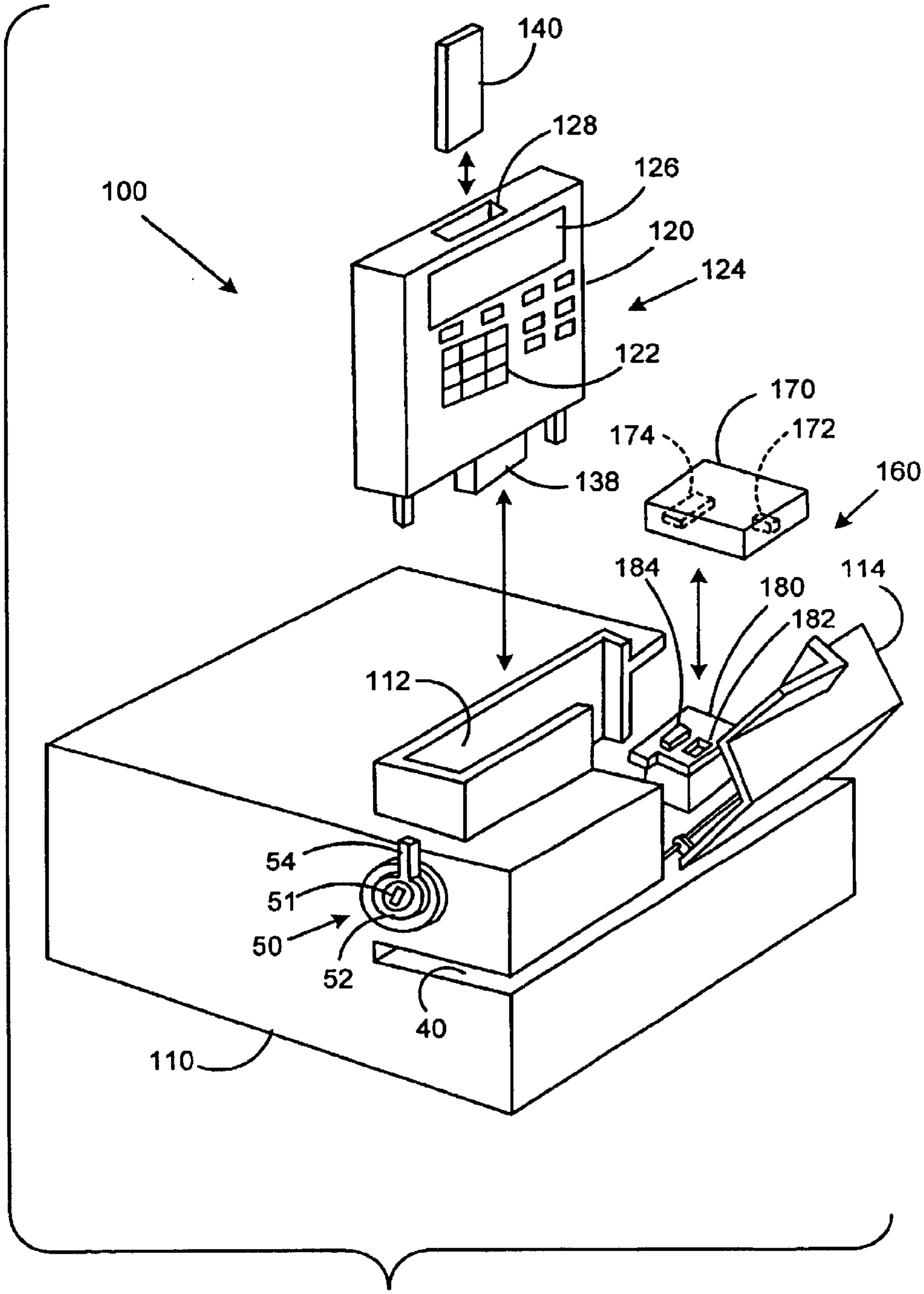
FIG. 2 is a perspective exploded view of the postage metering system in accordance with the present invention.

Referring to FIG. 2, an exploded view of the postage metering system 100 in the first most preferred configuration is shown. Referring to FIGS. 1, 2 and 5, the base 110 includes a printer cover 114 that is mounted to the base 110 in a conventional manner to pivot between a closed position as shown in FIG. 1 and an open position as shown in FIG. 2. The printer cover 114 pivots to the open position so as to provide access to the printer assembly 160. The printer assembly 160 is preferably of the ink jet printing type. However, any suitable dot matrix or digital printing technology (thermal transfer, electrophotographic, wire impact, etc.) may be utilized.

The printer assembly 160 includes a printer control module 170, a carriage assembly 180, a maintenance system 190 and an ink supply (not shown). The carriage assembly 180, the maintenance system 190 and the ink supply (not shown) are mounted to the base 110 in any conventional manner. The printer control module 170 is detachably mounted to the carriage assembly 180 in a conventional manner. The printer control module 170 includes a micro controller 171, a print mechanism 172, a driver 173 for activating the print mechanism 172, a read access memory (RAM) 175 for storing print data and a contact pad 174. The carriage assembly 180 repositions the printer control module 170 between a print position (shown) where the printer control module 170 is positioned above the deck 40 in alignment with the path of travel to effect printing on the mailpiece 20 and a home position (not shown) where the printer control module 170 is in contact with the maintenance system 190. The carriage assembly 180 includes an opening 182 and a contact pad 184. When the printer control module 170 is mounted to the carriage assembly 180, the print mechanism 172 is in alignment with the opening 182 so that the print mechanism 172 has an unobstructed view of the mailpiece 20 and the printer control module contact pad 174 is in mating relationship with the carriage assembly contact pad 184 so that the printer control module 170 may receive power from the base 110 and be in operative communication with the rest of the postage metering system 100.

Figure 3:
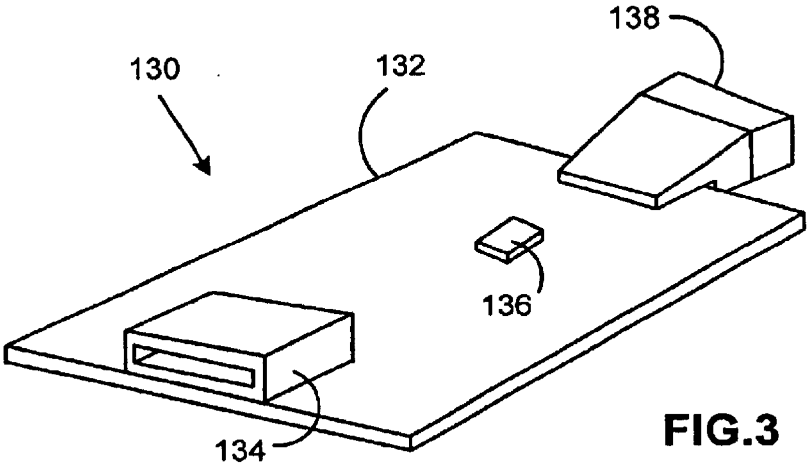
FIG. 3 is a perspective view of a print circuit board assembly from the user interface in accordance with the present invention.

Referring to FIG. 3, a perspective view of a printed circuit board assembly 130 contained within the user interface 120 is shown. Referring to FIG. 3 in view of FIGS. 3 and 5, the printed circuit board assembly 130 includes a printed circuit board 132 having located thereon the electronic devices (not shown), such as: a micro controller, a keypad activation membrane and other discrete components, responsible for controlling the operation of the user interface 120. The printed circuit board assembly 130 also includes a smart card reader interface connector 134, an integrated circuit (IC) chip socket 136 and an external base interface connector 138. The smart card reader interface connector 134 is mounted in alignment with the slot 128 so as to receive the postage meter 140 when the postage meter 140 is inserted into the user interface controller 120. In this manner, the postage meter interface connector 144 is operationally coupled to the smart card reader interface connector 134 so that the smart card reader interface connector 134 provides for the transmission of commands and data between the postage meter 140 and the user interface 120. The IC chip socket 136 serves as a printed circuit board mounting socket for an IC chip 240. The external base interface connector 138 is mounted so as to achieve proper mating relationship with a corresponding connector 118 located in the base 110 when the user interface 120 is inserted into the pocket 112. Further details of the operation of the user interface 120 will be provided below.

Figure 4:
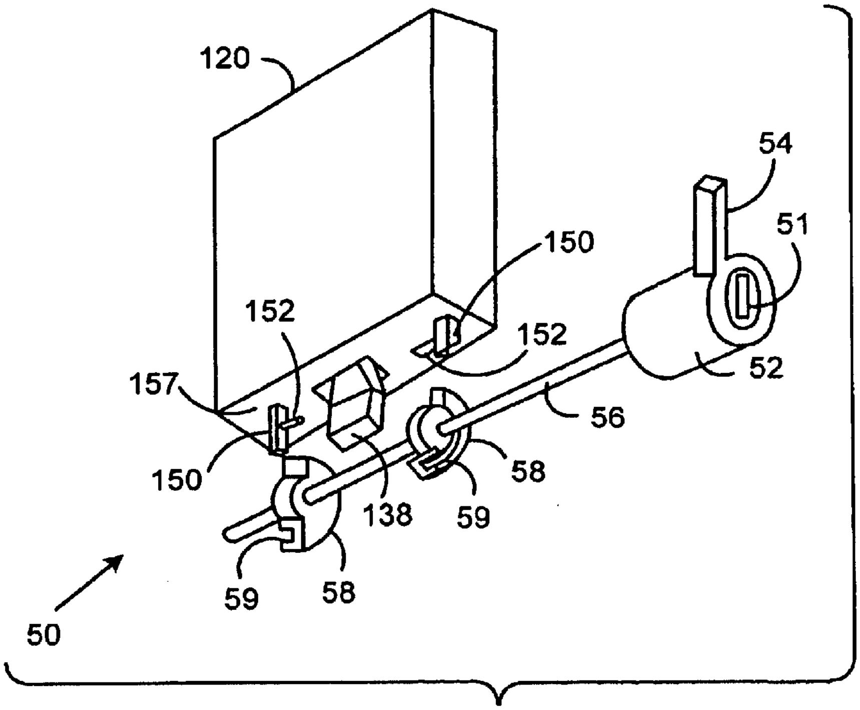
FIG. 4 is a perspective exploded view from behind and underneath the user interface in accordance with the present invention.

Referring to FIG. 4, a perspective exploded view from behind and underneath the user interface 120 is shown. Referring to FIG. 4, in view of FIGS. 1, 2 and 5, a more detailed explanation of the mechanical aspects of mounting the user interface 120 to the base 110 will now be provided. The user interface 120 includes a pair of guide posts 150 located on either side of the external base interface connector 138 and each having a corresponding latch pin 152. The guide posts 150 engage corresponding sleeves (not shown) located within the pocket 112 of the base 110 in conventional fashion so as to align the user interface 120 properly during assembly so that the external base interface connector 138 is brought into proper mating relationship with the base connector 118.

The latch assembly 50 includes a knob 52 having a lever 54, a shaft 56 and a pair of latch cams 58 having respective internal cam tracks 59. The shaft 56 is rotatively mounted by any conventional means (not shown), such as bearings, to any suitable structure (not shown), such as a frame. The knob 52 and the pair of latch cams 58 are fixably mounted to the shaft 56 in any conventional manner. The latch cams 58 correspond to the latch pins 152. The operator or other authorized individual may rotate the knob 52 to a latch position as shown in FIG. 1 to secure the user interface 120 to the base 10 or to an unlatch position as shown in FIG. 2 to release the user interface 120. In the unlatch position, the latch pins 152 are out of contact with the corresponding internal cam tracks 59, respectively. However, when the user interface 120 is inserted onto the base 110, the knob 52 may be rotated to the latch position. During this operation, as the knob 52 begins to rotate, the latch pins 152 are captured in the internal cam tracks 59, respectively. As the knob 52 continues to rotate, the shape of the internal cam tracks 59 is designed to pull down on the latch pins 152 and secure the user interface 120 in place. Optionally, the latch assembly 50 may include a lock 51 so that only authorized individuals may attach and detach the user interface 120 to the base 110.

With the structure of the postage metering system 100 in accordance with the first most preferred configuration described as above, various operational aspects of the first most preferred configuration and alternative preferred configurations will now be described.

Referring to FIGS. 1–5 with respect to the postage metering system 100 in accordance with the first most preferred configuration, the postage meter 140 is configured as a smart card device. Therefore, the portability and efficiencies of these types of devices are readily available. In this configuration, the IC chip socket 136 located on the printed circuit board assembly of the user interface 120 is not utilized. That is, no IC chip 240 is installed in this socket 136 and the user interface micro controller 121 is configured to address the smart card reader interface connector 134 to communicate with the postage meter 140.

Those skilled in the art will now recognize that the postage metering system 100 of the first most preferred configuration is comprised of four separable modules: the postage meter 140, the user interface 120, the printer control module 170 and the base 110. In this configuration, the smart card based postage meter 140 represents the module over which the postal authority regulates most heavily. Because the modules are separable, the manufacturer realizes efficiencies in servicing the postage metering system 100 since only those modules that have malfunctioned need be replaced.

In a second most preferred configuration, the smart card based postage meter 140 is not used. This configuration may be adopted in those countries that do not permit smart card based postage meters. In this configuration, the IC chip 240 is mounted in the IC chip socket 136 and the user interface micro controller 121 is configured to ignore the smart card reader interface connector 134 and address the IC chip 240 via the socket 136 for postage meter type communications. The IC chip 240 includes all the postage metering functionality as described above with respect to the smart card based postage meter 140, such as having a micro controller for generating tokens and a memory for storing accounting information (not shown) and register data. Once assembled to the socket 136, the IC chip 240 may be covered by a protective layer of epoxy.

Those skilled in the art will now recognize that the postage metering system 100 of the second most preferred configuration is comprised of three separable modules: the user interface 120 having the IC chip 240, the printer control module 170 and the base 110. In this configuration, the user interface 120 having the IC chip 240 defines the "postage meter" because the IC chip 240 is not separable from the user interface 120 by the operator.

Thus, by either providing a smart card based postage meter 140 or an IC chip 240 and configuring the user interface micro controller 121 to address the smart card reader interface connector 134 or the socket 136, respectively, the postage metering system 100 may be configured in either the first most preferred configuration or the second most preferred configuration, respectively. The user interface 120 may be configured in a variety of ways. In a first way, the micro controller 121 may be parameterized by the manufacturer prior to installation with an instruction as to where to look for postage metering communications. Preferably, this parameterization is done by loading a postage meter configuration indicator into protected memory within the micro controller 121. In a second way, the micro controller 121 may execute a one time configuration program during its first initialization to see which type of postage metering device is installed. For example, if a smart card based postage meter 140 is installed in the smart card reader interface connector 134, then the micro controller 121 will store an indicator of the first most preferred configuration. Similarly, if an IC chip is installed in the socket 136, then the micro controller 121 will store an indicator of the second most preferred configuration. In the case where neither a smart card based postage meter 140 nor an IC chip 240 is installed, the program may default to storing the indicator of the first most preferred configuration. In the case where both a smart card based postage meter 140 and an IC chip 240 is installed, the program may default to storing an indicator of the second most preferred configuration. In a third way, the configuration program may be run at each power-up of the user interface 120.

Those skilled in the art will recognize that the postage metering system manufacturer achieves operational advantages by standardizing on the printed circuit board assembly 130 contained within the user interface 120. However, the flexibility to manufacture different postage meter configurations is provided for.

Still further operational advantages may be achieved with respect to the smart card based postage meter 140 and the IC chip 240. Preferably, the IC chip 142 of the smart card based postage meter 140 and the IC chip 240 are the same device. In this manner, the manufacture may make generic IC chips and either install them in a smart card package to create the smart card postage meter 140 or install them on the printed circuit board assembly 130 via the socket 136. Thus, both the first and the second most preferred configurations for the postage meter take advantage of the same technology platform for postage metering functions. This leads to increased efficiencies because manufacture of the IC chips may be standardized. Additionally, product development time is reduced because two distinct postage meter configurations may be marketed without changing the development time for the postage meter functionality.

As in the second most preferred configuration, in a third most preferred configuration, the user interface 120 includes the IC chip 240. However, the user interface 120 may not be removed from the base 110 by the operator. This configuration may be adopted in those countries that prefer the postage metering system to be an integral unit. In this configuration, the user interface 120 is mounted in the base 110 and the key for the lock 51 of the latch assembly 50 is not provided to the operator. Instead, the key is retained by the postal authorities or other authorized individuals for use in inspecting or servicing the postage metering system 100. As an alternative, the knob 52 may be discarded entirely. Instead, a seal (not shown) may be used in conventional fashion to block access to the shaft 56.

Those skilled in the art will now recognize that the postage metering system 100 of the third most preferred configuration is comprised of two separable modules: the base 110 and the user interface 120 having the IC chip 240 and the printer control module 170. In this configuration, the base 110 and the user interface 120 having the IC chip 240 define the "postage meter" because the user interface 120 having IC chip 240 is not separable from the base 110 by the operator.

As in third most preferred configuration, in a fourth most preferred configuration, the user interface 120 includes the IC chip 240 and may not be removed from the base 110 by the operator. Additionally, locking the user interface 120 onto the base 110 also secures the printer cover 114 in the closed position and prevents it from pivoting to the open position. This configuration may be adopted in those countries that not only prefer the postage metering system to be an integral unit, but do not allow operator access to the printer control module 170.

The printer cover 114 may be locked in the closed position in any conventional manner. However, it is preferable to take advantage of the same techniques that are utilized for securing the user interface 120 to the base 110. For example, another cam latch 58 may be added to the shaft 56 and a corresponding latch pin (not shown) molded into an inner surface of the printer cover 114. Thus, rotating the shaft 56 into a locked position secures both the user interface 120 and the printer cover 114 in the same operation. As another example, the user interface 120 when installed on the base 110 may simply interfere with the printer cover 114 to prevent it from pivoting to the open position. This may be accomplished by providing a tab (not shown) on an inner surface of the printer cover 114 that is locked down by an underside surface 157 of the user interface 120.

Those skilled in the art will now appreciate the present invention substantially addresses those objects and advantages presented earlier. For example, interchangeability of the user interface, postage meter and the printer and multiple configuration capability is provided for. As a result, the diverse requirements of different postal authorities may be met by a single postage metering system platform. Therefore, inventory control and distribution are simplified while product development time for multiple configurations is reduced.

Many features of the preferred embodiment represent design choices selected to best exploit the inventive concept as implemented in a postage metering system having a postage meter, base and a printer. However, those skilled in the art will recognize that the concepts of the present invention can be applied to other postage metering system configurations that do not include a base, such as where the postage meter is a stand-alone unit in operative communication with a remote printer. That is, the present invention is applicable to any postage metering system where the postage-metering portion is remotely located from the printing portion. In this context, remote may mean adjacent, but not co-located within the same secure structure, or physically spaced apart.

Therefore, the inventive concept in its broader aspects is not limited to the specific details of the preferred embodiment but is defined by the appended claims and their equivalents.

What is claimed is:

1. A postage metering system, comprising:

a base including a base processor, a deck and a transport for feeding a mailpiece along the deck in a path of travel;

a printer assembly operatively mounted to the base, the printer including a printer control module and a print mechanism under the control of the printer control module, the print mechanism being located adjacent to the path of travel for printing on the mailpiece, the printer control module being operatively mounted to the printer assembly;

a user interface operatively mounted to the base, the user interface including a user interface processor in operative communication with the base processor and the printer control module, an internal socket for receiving a processor and an external processor reader interface connector for interfacing with an external processor; and wherein:

the user interface processor includes a memory for storing a postage meter configuration indicator that controls whether the user interface processor accesses postage metering functionality at either the external processor reader interface connector or the internal socket.

2. The postage metering system of claim 1, wherein:

the internal socket is adapted to receive an integrated circuit chip processor that also serves as a processor platform the external processor.

3. The postage metering system of claim 2, wherein:

the external processor comprises a smart card.

4. A method of manufacturing a postage metering system, comprising:

providing a base including a base processor, a deck and a transport for feeding a mailpiece along the deck in a path of travel;

providing a printer assembly operatively mounted to the base, the printer including a printer control module and a print mechanism under the control of the printer control module, the print mechanism being located adjacent to the path of travel for printing on the mailpiece, the printer control module being operatively mounted to the printer assembly;

providing a user interface operatively mounted to the base, the user interface including a user interface processor in operative communication with the base processor and the printer control module, an internal socket for receiving an internal processor and a processor reader interface connector for interfacing with an external processor; and storing a postage meter configuration indicator in a memory accessible to the user interface processor that controls whether the user interface processor accesses postage metering functionality at either the processor reader interface connector or the internal socket.

5. The method of claim 4, further comprising:

providing the internal socket configured to receive an integrated circuit chip processor that also serves as a processor platform for the external processor.

6. The method of claim 5, wherein:

the external processor comprises a smart card.

7. A method of metering postage in a postage meter having a base including a base processor, a deck and a transport for feeding a mailpiece along the deck in a path of travel, a printer assembly operatively mounted to the base, the printer including a printer control module and a print mechanism under the control of the printer control module, the print mechanism being located adjacent to the path of travel for printing on the mailpiece, the printer control module being operatively mounted to the printer assembly, a user interface operatively mounted to the base, the user interface including a user interface processor in operative communication with the base processor and the printer control module, an internal socket for receiving an internal processor and a processor reader interface connector for interfacing with an external processor, and a postage meter configuration indicator stored in a memory accessible to the user interface processor comprising:

receiving an indication of whether an external processor is present;

receiving an indication of whether an internal processor is present;

determining whether the user interface processor accesses postage metering functionality at either the processor reader interface connector or the internal socket using the postage meter configuration indicator.

8. The method of claim 7, wherein:

the external processor comprises a smart card.

* * * * *